US012771525B2

(12) United States Patent
Tian et al.

(10) Patent No.: US 12,771,525 B2
(45) Date of Patent: Oct. 20, 2026

(54) LOG-STRUCTURED SECURE DATA STORAGE METHOD AND APPARATUS

(71) Applicant: Alipay (Hangzhou) Information Technology Co., Ltd., Hangzhou (CN)

(72) Inventors: Hongliang Tian, Hangzhou (CN); Weijie Liu, Hangzhou (CN); Qing Li, Hangzhou (CN); Zongmin Gu, Hangzhou (CN); Shoumeng Yan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 39 days.

(21) Appl. No.: 18/865,263

(22) PCT Filed: Apr. 7, 2023

(86) PCT No.: PCT/CN2023/087004
§ 371 (c)(1),
(2) Date: Nov. 12, 2024

(87) PCT Pub. No.: WO2023/216783
PCT Pub. Date: Nov. 16, 2023

(65) Prior Publication Data
US 2025/0317275 A1 Oct. 9, 2025

(30) Foreign Application Priority Data
May 13, 2022 (CN) ......................... 202210520607.7

(51) Int. Cl.
*H04L 9/06* (2006.01)
*G06F 21/78* (2013.01)

(52) U.S. Cl.
CPC ............ *H04L 9/0618* (2013.01); *G06F 21/78* (2013.01)

(58) Field of Classification Search
CPC ... H04L 9/0618; G06F 21/78; G06F 21/6218; G06F 21/602
(Continued)

(56) References Cited

U.S. PATENT DOCUMENTS

2004/0146158 A1* 7/2004 Park ...................... H04L 9/0637 380/37
2014/0006685 A1* 1/2014 Peterson ............. G06F 12/0238 711/102
2016/0378653 A1 12/2016 Lu et al.

FOREIGN PATENT DOCUMENTS

CA 2637218 A1 * 6/2008 ......... H04L 61/1097
CN 111295649 A 6/2020
(Continued)

OTHER PUBLICATIONS

"International Search Report" regarding Intl. Application No. PCT/CN2023/087004, mailed on Jun. 23, 2023, pp. 1-9.

*Primary Examiner* — Bryan F Wright

(57) ABSTRACT

Embodiments of this specification provide a log-structured secure data storage method and apparatus, to securely store data in a hard disk in a trusted execution environment (TEE). Such a data operation is performed based on the following three logical data structures: a data block on which an operation such as write/read/retrieval can be performed, a secure index, and a security log. The data block is appended to the hard disk in a ciphertext form. The secure index is an index that is created based on a log-structured merge tree for each index entry generated for each ciphertext data block. The security log is used to record, in the append manner, operation information of writing the data block or the index entry to the hard disk. Such a data storage architecture can reduce, on the basis of data confidentiality, write amplification of storing data in the hard disk in the TEE.

18 Claims, 6 Drawing Sheets

(58) Field of Classification Search
USPC .......................................................... 380/37
See application file for complete search history.

(56) References Cited

FOREIGN PATENT DOCUMENTS

| | | | | | |
|---|---|---|---|---|---|
| CN | 111886591 | A | 11/2020 | | |
| CN | 114356877 | A | 4/2022 | | |
| CN | 114817994 | A | 7/2022 | | |
| EP | 1426848 | A2 * | 6/2004 | ............. | G06F 21/40 |
| WO | WO-2023158239 | A1 * | 8/2023 | ............. | G06F 21/64 |

* cited by examiner

LOG-STRUCTURED SECURE DATA STORAGE METHOD AND APPARATUS

CROSS-RELATED APPLICATIONS

This specification is a national stage entry of international application no. PCT/CN2023/087004, filed Apr. 7, 2023, which claims priority to Chinese Patent Application No. CN202210520607.7, filed with the China National Intellectual Property Administration on May 13, 2022 and entitled "LOG-STRUCTURED SECURE DATA STORAGE METHOD AND APPARATUS", which is incorporated herein by reference in its entirety.

TECHNICAL FIELD

One or more embodiments of this specification relate to the field of secure computing technologies, and in particular, to a log-structured secure data storage method and apparatus.

BACKGROUND

With development of computer technologies, privacy preserving of computer data becomes a relatively important research direction. A trusted execution environment (TEE) becomes more popular in recent years. In the computer field, corresponding TEE solutions (for example, Intel SGX, AMD SEV, RISC-V Keystone, and Power PEF) are implemented in some main CPU architectures, or a corresponding TEE solution (Intel TDX or Arm CCA) is announced. These TEE solutions can enable TEE users (for example, a cloud tenant) to run sensitive applications of the TEE users in private memory regions. The private memory regions cannot be snooped on or tampered with by privileged attackers (for example, cloud operators). Emergence of the TEE provides a new pattern for confidential computing, and can resolve a trust problem that impedes many use scenarios (for example, cloud computing).

Although a memory of the TEE is protected by hardware, hard disk data of the TEE (especially when the TEE runs) need to be protected by software. In other words, security of writing, when the TEE runs, data to a hard disk that is not protected by hardware is very important. To ensure data security, write amplification generated when data are written is also a problem that needs to be concerned.

SUMMARY

One or more embodiments of this specification describe a log-structured secure data storage method and apparatus, to resolve one or more problems mentioned in the background.

According to a first aspect, a log-structured secure data storage method is provided for protecting a block I/O operation performed by a user on an untrusted hard disk in a trusted execution environment. The method includes: separately encrypting several data blocks submitted by the user, to obtain all corresponding ciphertext data blocks, and persisting all the ciphertext data blocks in the hard disk in an append manner; respectively generating all corresponding index entries for all the ciphertext data blocks, where a single index entry is used to locate and protect one ciphertext data block; respectively inserting all the index entries into secure indexes based on a log-structured merge tree, where the secure indexes are persisted in the hard disk; generating several log entries for the ciphertext data blocks, where the log entries are used to locate and protect the corresponding ciphertext data blocks when a system crash occurs, and a single log entry corresponds to one or more ciphertext data blocks; and appending the several log entries to a security log of the hard disk, where the security log is persisted in the hard disk.

In an embodiment, the several data blocks include a first data block, authenticated encryption is performed on the first data block based on a first key $key_1$, to obtain a first ciphertext data block and an authentication code $MAC_1$, the first ciphertext data block is located and protected by a first index entry, and the first index entry includes a logical address $LBA_1$ of the first data block and a physical address $HBA_1$, the first key $key_1$, and the authentication code $MAC_1$ that are stored in the hard disk.

In an embodiment, the several data blocks are a plurality of data blocks of a current data segment that are recorded in a memory in the append manner in a sequence in which the user makes submissions, and the several data blocks submitted by the user are separately encrypted, to obtain all the corresponding ciphertext data blocks.

In an embodiment, all the ciphertext data blocks are persisted in the hard disk in the append manner when a first condition for writing a data segment to the hard disk is satisfied, and the first condition includes at least one of the following: the current data segment is fully written, a flushing request is received, or record duration reaches predetermined duration.

In an embodiment, the log-structured merge tree corresponds to a first memory table, a second memory table, and a plurality of levels in the hard disk, the second memory table is used to be persisted at the plurality of levels, a block index table at each level is capable of being successively merged into subsequent levels until the last level, and inserting the several index entries into secure indexes based on a log-structured merge tree includes: inserting the several index entries into the current first memory table; and when a second condition for index persistence is satisfied, converting the first memory table into the second memory table, to write an index entry in the second memory table to a first level in the plurality of levels.

In an embodiment, the index entry is recorded in a form of the block index table (BIT) at a single level in the plurality of levels, a leaf node of a single BIT corresponds to one or more index entries, and a single non-leaf node stores an LBA range of a data block corresponding to each index entry in a child node of the single non-leaf node and each authentication code MAC for performing authenticated encryption protection on each child node.

In an embodiment, writing an index entry in the second memory table to a first level in the plurality of levels includes: traversing LBAs in the second memory table, to generate all BITs, where a single BIT corresponds to a plurality of consecutive index entries in the second memory table, and the plurality of index entries in the BIT are arranged in ascending order; and appending all the BITs to the first level in a completion sequence of all the BITs.

In an embodiment, the single BIT is generated in the following manner: obtaining, based on a single LBA range corresponding to a single leaf node, an index entry that satisfies the single LBA range, and recording the index entry in the single leaf node; and after a leaf node corresponding to a single non-leaf node completes a record, recording, in the non-leaf node based on an LBA range of the corresponding leaf node and an index entry in the corresponding LBA range, an authentication code MAC for performing authenticated encryption protection.

In an embodiment, each log entry in the security log is stored in a form of a log block, authenticated encryption protection is performed on each log block based on a corresponding authentication code MAC, and a MAC of a single log block is embedded into a next log block.

In an embodiment, the hard disk further records a reverse index table of mapping from an HBA to an LBA, and when the several index entries are inserted into the secure index based on the log-structured merge tree, the method further includes: updating the reverse index table based on the several index entries.

In an embodiment, the hard disk further records a first segment validity table (SVT) that describes, by using a bitmap, whether each data segment is valid and a data segment table (DST) that describes whether each data block in the data segment is valid, and the method further includes: updating the first segment validity table and the data segment table (DST) when all the ciphertext data blocks are persisted in the hard disk in the append manner.

In an embodiment, the hard disk further stores a second segment validity table (SVT) that describes, by using a bitmap, whether each block index table (BIT) is valid, and the method further includes: updating the second segment validity table when the block index table at each level is capable of being successively merged into the subsequent levels or the index entry in the second memory table is written to the first level in the plurality of levels.

According to a second aspect, a log-structured secure data storage apparatus is provided for protecting a block I/O operation performed by a user on an untrusted hard disk in a trusted execution environment. The apparatus is disposed in the trusted execution environment, and includes:

- a data storage unit, configured to: separately encrypt several data blocks submitted by the user, to obtain all corresponding ciphertext data blocks, and persist all the ciphertext data blocks in the hard disk in an append manner;
- an index generation unit, configured to respectively generate all corresponding index entries for all the ciphertext data blocks, where a single index entry is used to locate and protect one ciphertext data block;
- an index storage unit, configured to respectively insert all the index entries into secure indexes based on a log-structured merge tree, where the secure indexes are persisted in the hard disk;
- a log generation unit, configured to generate several log entries for the ciphertext data blocks, where the log entries are used to locate and protect the corresponding ciphertext data blocks when a system crash occurs, and a single log entry corresponds to one or more ciphertext data blocks; and
- a log storage unit, configured to append the several log entries to a security log of the hard disk, where the security log is persisted in the hard disk.

According to a third aspect, a computer-readable storage medium is provided. The computer-readable storage medium stores a computer program, and when the computer program is executed on a computer, the computer is enabled to perform the method in the first aspect.

According to a fourth aspect, a computing device is provided, including a memory and a processor. The memory stores executable code, and when the processor executes the executable code, the method in the first aspect is implemented.

According to the log-structured secure data storage method and apparatus provided in the embodiments of this specification, a secure operation of data can be performed on the hard disk in a secure zone, namely, the trusted execution environment. Such a data operation is performed based on the following three logical data structures: a data block on which an operation such as write/read/retrieval can be performed, a secure index, and a security log. The data block is written to the hard disk in a ciphertext form through the append manner. The secure index is an index that is created based on a log-structured merge tree for each index entry generated for each ciphertext data block. The security log is used to record, in the append manner, operation information writing the data block or the index entry to the hard disk.

A data block to be written to the hard disk is received in the TEE, and the data block is appended to the hard disk. In addition, an index entry is generated for each ciphertext data block in a ciphertext data segment, a hard disk of the index entry is inserted into the secure index based on the log-structured merge tree, and the secure index can be persisted in the hard disk in an encryption manner. Furthermore, the log entry is generated for the ciphertext data block written to the hard disk, and the log entry is appended to the security log of the hard disk. The security log is persisted in the hard disk in an encrypted manner, so that a hard disk of a related index entry is recovered in a case of a crash, etc. In this manner, the data block is recorded in an append manner (different from a manner of modifying or overwriting data of an old version). An index entry corresponding to data of a new version can be first obtained through retrieval in the used log-structured merge tree (no historical index entry needs to be modified). In this way, write amplification can be reduced on the basis of data confidentiality, and validity of storing data in a non-securely protected hard disk in the TEE is improved.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The technical solutions provided in this specification are described below with reference to the accompanying drawings.

Several technical terms that may be involved in this specification are first described.

TEE is short for trusted execution environment, and can also be denoted as TEEs. The TEE provides a trusted environment isolated from a rich execution environment (REE), provides more secure space for execution of data and code, and ensures confidentiality and integrity of the data and code. Usually, the TEE can directly obtain information in another zone of a device, and the another zone cannot obtain information in the TEE.

LSM-trees is short for log-structured merge tree. Data in the LSM-tree are recorded in an append form, to store the permanent data and an index of the data in a log. The data and the index of the data are added to the end of the log each time, so that a file system is sequentially accessed in most cases. In this way, hard disk bandwidth utilization is improved, and a fault recovery speed is fast (for details, references can be made to a record in https://www.cnblogs.com/siegfang/archive/2013/01/12/1sm-tree.html, etc.).

MHT is short for Merkle hash trees, or denoted as MHTs. In the Merkle hash tree, data in each parent node are a hash function of data in a child node of the parent node, and data in a leaf node are a hash value of an atomic data block (for details, references can be made to a record in https://zhuanlan.zhihu.com/p/474938589, etc.).

MAC is short for message authentication code. The MAC may also be briefly referred to as an authentication code in this specification, and is usually used for authenticated encryption protection. The MAC can map a message of any length to a short fixed-length data packet under control of a key, and can be attached to a corresponding message (for example, for details, references can be made to a record in https://blog.csdn.net/feierxiaoyezi/article/details/51132063?locationNum=12, etc.).

Figure 1:
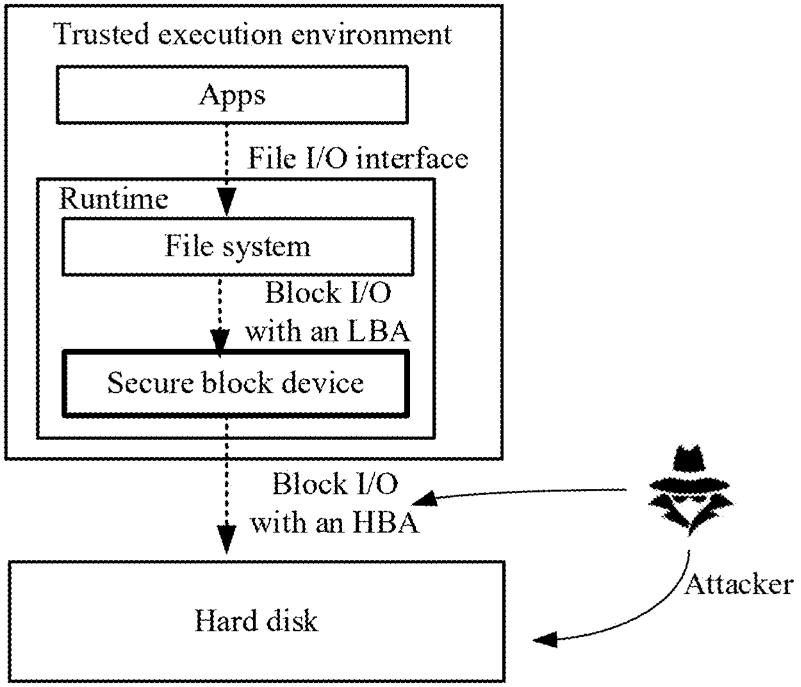
FIG. 1 is a schematic diagram illustrating an implementation scenario, according to this specification.

FIG. 1 shows a specific applicable scenario of this specification. In the scenario shown in FIG. 1, a trusted execution environment and an untrusted hard disk are involved. One or more applications (apps) run in the trusted execution environment (TEE), and various file data are generated in an application running process. These file data need to be recorded in real time. However, the TEE usually uses memory space and has limited space. Therefore, data generated by the app need to be recorded in an external untrusted hard disk of the TEE by using a secure block device in the TEE.

The secure block device is a module that protects, by using a software or hardware device integrated into the TEE, a file I/O of the TEE when the TEE runs. The secure block device can transparently protect all block I/Os from a file I/O stack. In this manner, no additional attention needs to be paid to security of the file I/O while the file I/O stack can be allowed to be left in another part of the TEE (including an existing file system to which no modification is made or only a minor modification is made is used inside the TEE).

In FIG. 1, the secure block device is indicated by using a bold box. The secure block device executes the technical solutions discussed in this specification, to implement the following three functions:

- read, for example, read(LBA, nblocks, buf), indicates to read data from the hard disk to a buffer buf starting from an LBA address of a nblocks block;
- write, for example, write(LBA, nblocks, buf), indicates to write data from the buffer buf to the hard disk starting from the LBA address of the nblocks block; and
- flush, for example, flush( ) indicates to ensure that all updated data are stored in the hard disk.

Specifically, the app can invoke a file I/O interface to forward, to the secure block device in the TEE, a file I/O block (which can also be referred to as a data block below) generated in a running process of the app, and the secure block device forwards the file I/O block to the untrusted hard disk. A file I/O required by the app can be read by the secure block device from the hard disk and returned by invoking the file I/O interface.

All data written to or read from the secure block device are in a plaintext form. The secure block device is responsible for properly encrypting/decrypting data to be transmitted to or from the hard disk. To distinguish between a block address in the trusted secure block device and a block address in the untrusted hard disk, a data identifier carried when the app submits data to the secure block device can be referred to as a logical block address (LBA), and a storage address at which the secure block device stores data in the hard disk is referred to as a host block address (HBA), or can be referred to as a physical address.

The hard disk is untrusted. It is assumed that an attacker has a privilege to control any hardware and software outside the TEE on a host, can choose to attack at any time selected throughout a lifecycle of the TEE, and has a capability of tampering (instead of merely monitoring) with any I/O request and response of the hard disk. Specifically, a type of the attack that may be made by the attacker includes but is not limited to a snooping attack (monitoring I/O), a tampering attack (forged block), or a rollback attack (replay an old block).

To resist such an attacker, the secure block device needs to provide at least the following security guarantee for a block interface of the secure block device: confidentiality that means that user data submitted by any write operation is not leaked; integrity that ensures that user data returned through any read is actually generated by the user; freshness that ensures that the user data returned through any read is latest updated user data; and a consistency (or a crash consistency) that ensures that all security guarantees are still valid in a case of any accidental or malicious crash.

To achieve these security objectives, a conventional technology includes a technical solution of securely writing data to the hard disk such as an Intel SGX protected file system (SGX-PFS), Asylo, Graphene-SGX, Occlum, and SecureFs.

The SGX-PFS is used as an example. In the SGX-PFS, each file is considered as a secure block device based on a concept of a file, and a method in which an inplace update and a Merkle hash tree (MHT) are combined is used. The following describes, with reference to a schematic diagram in FIG. 2, how an open file of the SGX-PFS works. An SGX-PFS file can include three key components: the MHT (which realizes security), a cache (which realizes high efficiency), and a recovery log (which realizes a consistency). In the MHT, each node stored in the hard disk is subject to authenticated encryption protection. Authenticated encryption protection is protection based on an encryption key and an authentication code MAC for authenticated encryption protection. A leaf node includes file data, and a non-leaf node maintains an encryption key and an authentication code MAC of a child node of the non-leaf node. The MHT ensures confidentiality, integrity, and freshness of the file data. The file can provide a memory cache of a fixed size for a recently used node, to avoid performing a hard disk I/O each time a read or write is performed. Before a dirty node is flushed to the hard disk, the latest valid version of the dirty node is stored in the recovery log. In this way, if any crash occurs in a flushing period, the file can be recovered to the last valid and consistent state based on the recovery log.

Figure 2:
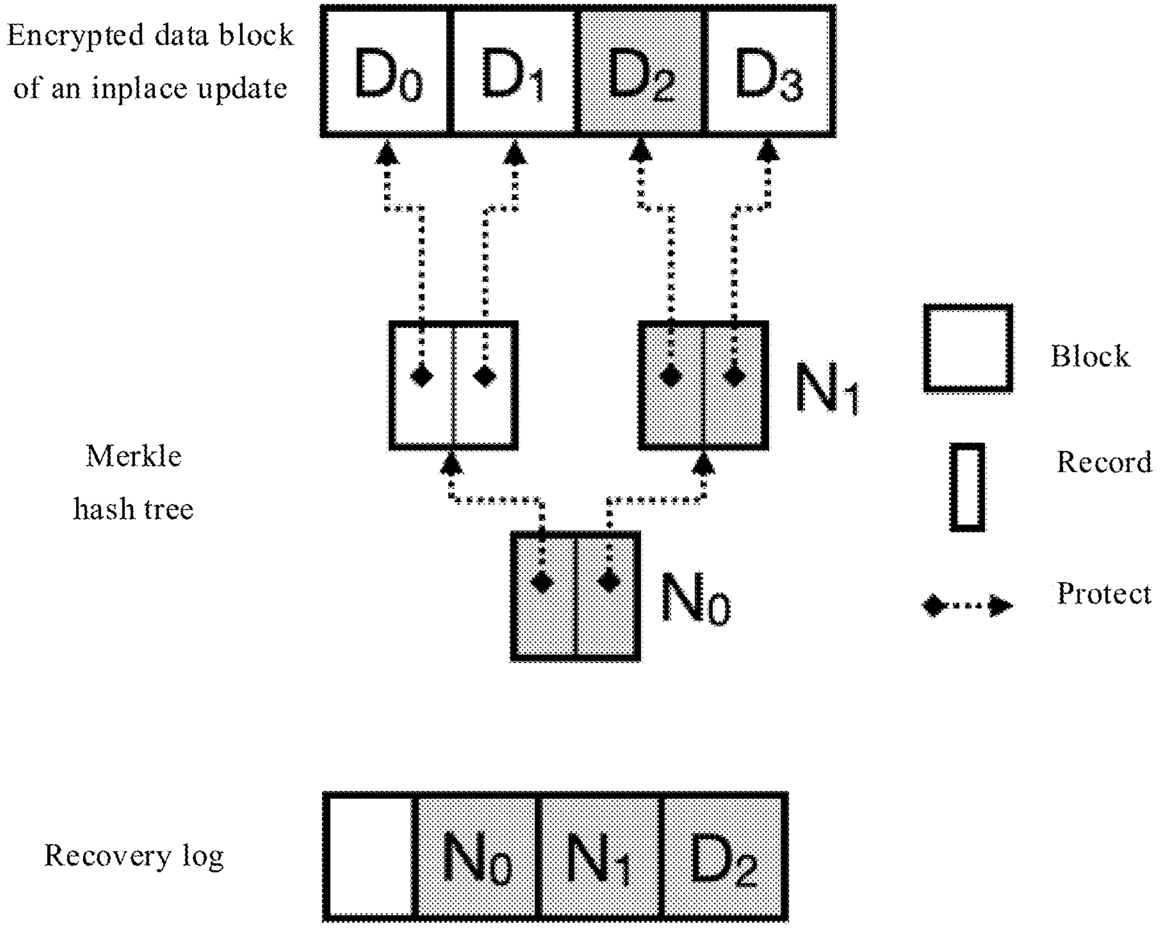
FIG. 2 is a schematic diagram illustrating a specific example of a real-time architecture in which data are written to a hard disk in a TEE, according to a conventional technology.

As shown in a data storage architecture shown in FIG. 2, specific write amplification is introduced in the SGX-PFS. Consequently, random write performance may be relatively poor. The write amplification can be determined by comparing a to-be-written data amount of the user and an actual data amount, for example, is a ratio of the actual data amount to the to-be-written data amount. The write amplification in the SGX-PFS mainly has two sources: the MHT and the recovery log. In the MHT, updating of the leaf node triggers updating of cascading of all parent nodes of the leaf node. This means that for a large enough file, an amplification factor of a random write is up to H. Here, H is the depth of the MHT. In addition, data are usually written for two times, to ensure a crash consistency: A new version is written to the leaf node of the MHT after an old version is stored in the recovery log. As shown in FIG. 2, a shadowed portion represents written content involved in written data D2. Therefore, in the worst case, the SGX-PFS can lead to a maximum of an amplification factor of 2×H.

In view of a write amplification problem in a conventional technology, this specification provides a new secure block device (for example, referred to as SwornDisk) structured solution, to reduce write amplification, and improve random write performance. As described above, the secure block device in the trusted execution environment can perform an operation of securely writing data to the hard disk, reading data from the hard disk, or querying data in the hard disk. The trusted execution environment (TEE) can also be replaced by another secure zone or secure environment. Details are omitted here for simplicity.

Figure 3:
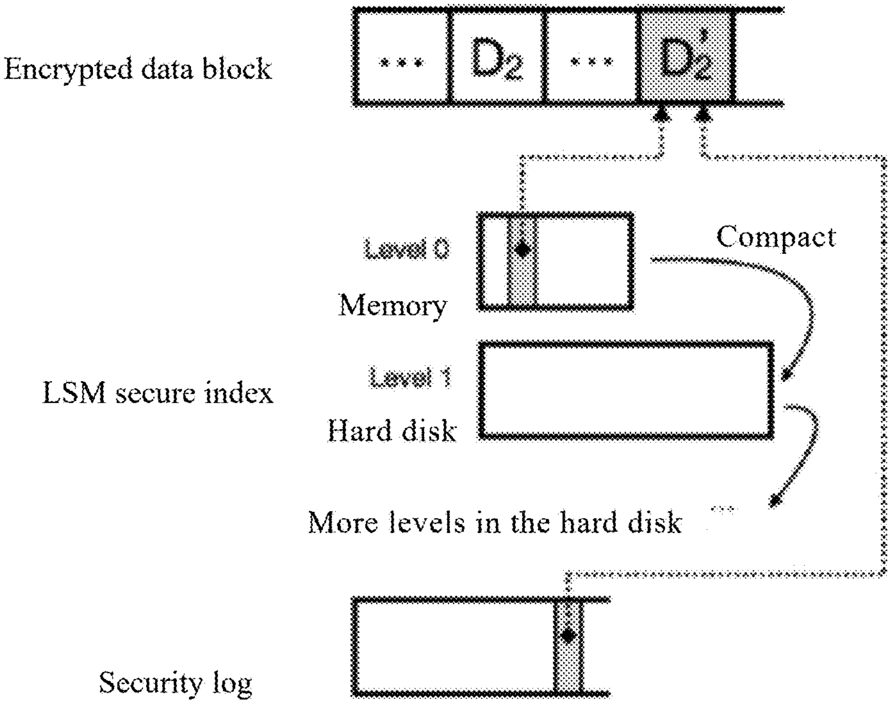
FIG. 3 is a schematic diagram illustrating a specific example of an implementation architecture in which data are written to a hard disk in a TEE, according to a technical concept of this specification.

FIG. 3 shows a specific implementation architecture of this specification. In a technical concept of this specification, an append data structure-based (log-structured) data storage manner is provided. As shown in FIG. 3, a data storage manner provided in this specification includes three levels: an encrypted data block, a secure index, and a security log.

First, an encrypted user data block subject to MAC authenticated encryption protection is written to the hard disk in an append (log) manner. Usually, a sequential write is more friendly to a storage medium regardless of a hard disk or a solid state drive. Therefore, the data block appended can improve original performance of an underlying hard disk to the maximum limit. In addition, because the append manner allows coexistence of a logical data block of a new version and a logical data block of an old version, data recorded in this manner also facilitates a crash recovery.

Second, a secure index is maintained, and an LBA is mapped onto a host block address (HBA, which is also referred to as a physical address, and represents an address at which a data block is actually stored in the hard disk), an encryption key, and a message authentication code (MAC), to locate and protect an encrypted data block. The index is implemented as a specially designed security variant of a log-structured merge tree (LSM-tree). The index can be specially designed based on a conventional LSM-tree, to update and query the index more securely and efficiently.

Third, a security log (Journal) is introduced, to record all recent hard disk updating, including updating of data, an index, and another hard disk data structure. A log entry in the security log is written to the hard disk in an append (log-structured) manner. The security log is a key to ensure a consistency and atomicity and another security attribute.

A variant of the log-structured merge tree (LSM) is used in a structure shown in FIG. 3, so that write amplification of a data write is reduced, and index security is ensured. The following first describes a principle of the LSM-tree.

Basic logic of the LSM-tree is a multi-level structure, has number of nodes in ascending order from top to bottom, and resembles a tree. A basic structure of the LSM-tree is that the first level of a memory usually stores all recently written key value pairs (K-v). In addition, a data structure in the memory is sorted, and an inplace update can be performed at any time (for example, data are added in a log manner), and a query is supported at any time. All other levels can be stored in the hard disk. Data at each level can be sorted based on a key K in the key value pair. When data are written, for a write operation request for a key value pair, the data can be appended to a previous key value pair record (Write Ahead Log), and then added to the first level of the memory. When space occupied by data at the first level reaches a specific size (for example, 4 megabytes), the first level is merged to the second level of the hard disk, and similar to merge sort, same keys are merged. Such a process is compaction. This is repeatedly performed, until the last level. A new level obtained through merging is sequentially written to the hard disk, to replace an original old level. Space occupied by each level reaches a specific size, and the level continues to merged with the lower level. After merging, all old files can be deleted, and a new file is retained. Basically, only a memory structure is used in a write process. Compaction can be implemented asynchronously in the background without impeding a write.

Here, because the data may be written repeatedly, a new version needs to overwrite an old version. For example, if (a=1) is written and then (a=233) is written, 233 is a new version recorded for a. If an old version 1 recorded for a is written to the last level, and the first level receives the new version, whether an old version of a file at subsequent levels exists is not considered. The old version at the subsequent levels can be cleared during merging. Because the latest data are at the front level and the oldest data are at the back level in a query process, the first level is first queried in the query process. If the key K to be queried does not exist, the second level is queried. By analogy, a query is performed level by level. Of course, if the key K is found, the latest version is usually found, and the query can be ended.

Figure 4:
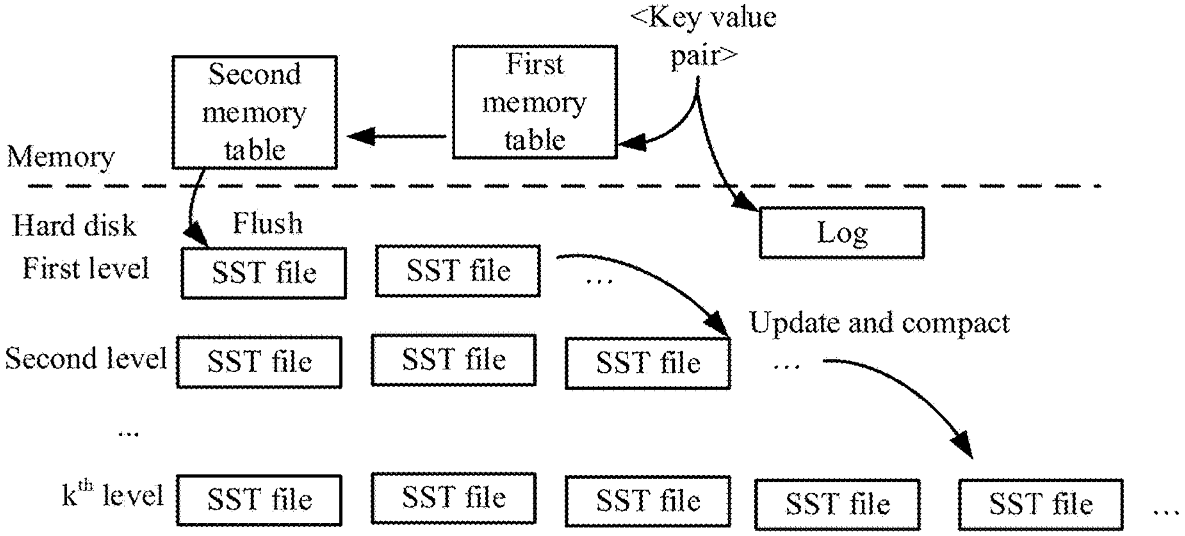
FIG. 4 is a schematic diagram illustrating an architecture of an LSM-tree, according to a conventional technology.

FIG. 4 shows an LSM-tree structure with an improved basic structure in a conventional technology. As shown in FIG. 4, an LSM-tree shown in FIG. 4 includes the following three types of files: a first memory table (memtable) that normally receives a write request (in a memory), an immutable second memory table (immutable memtable, immutable memory table) (in the memory), and a sorted string table (SStable, SST for short) in a hard disk. A sorted string in the SST is a key K of data. It should be noted that the first memory table and the second memory table here are named based on different functions, and the first memory table can be switched to the second memory table when the first memory table is used as an immutable memtable to implement a function of the second memory table. As shown in FIG. 4, there are a total of k levels of SSTs (k is an integer greater than 0), and a size of total space allocated to a next level can be N (for example, N=10) times of a size of a current level. All the levels can be sequentially denoted as the first level, the second level, . . . , and the $k^{th}$ level.

In an architecture shown in FIG. 4, when data are written, an index entry in a form of a key value pair (K, v) of a data block can be inserted into the first memory table. When the first memory table is fully written, the fully written first memory table can be switched to an immutable memtable, namely, the second memory table. In addition, a new first memory table memtable can be created to receive new written data. An index entry in the converted immutable memtable, namely, the second memory table can be persisted in the hard disk. That the index entry is persisted in the hard disk here can mean that the index entry directly flushes an SSTable file at the first level, and is not directly merged with the file at the level. When a size of the file at the first level exceeds a defined threshold (for example, 8 megabytes), one file can be selected to be merged with a file at a next level. In addition, after merging, each level is maintained sorted on the whole. In this way, each level can maintain a specified quantity of files, and ensure that keys K do not overlap. In other words, the same keys K are merged into the same file. Therefore, a key K needs to be searched for at one level, and only one file needs to be searched for.

In the architecture shown in FIG. 4, data are organized by using a file, and data are queried by a file. In an implementation architecture of this specification, there is only a data block, and there is no file structure. Therefore, a hard disk component system without being assisted by a file system needs to be constructed, so that an LSM-tree architecture can be used. In this specification, index information is organized, based on particularity of the data block, by a new structural unit in which there is no concept of a file.

Figure 5:
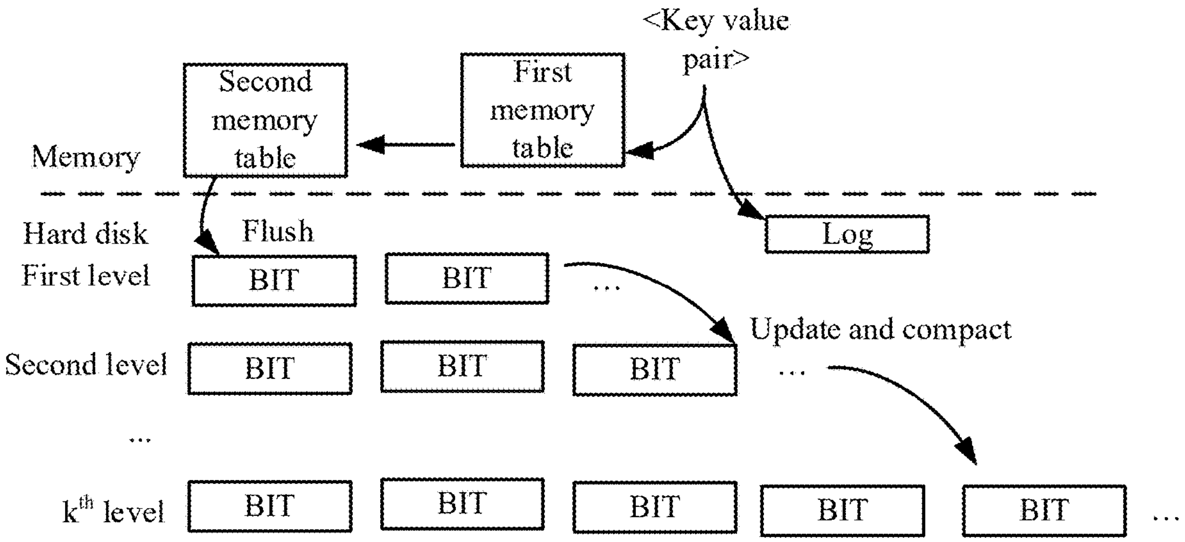
FIG. 5 is a schematic diagram illustrating an architecture of an improved LSM-tree, according to a technical concept of this specification.

In consideration of a "plane" structure that is of the data block and that is different from that of the file, the structural unit that organizes the index information in this specification simultaneously has three functions: hard disk management, retrieval (query), and security protection. A structural unit applicable to the data block can be provided with reference to an idea of a B+ tree in this specification, for example, is referred to as a block index table (BIT). In this way, the SST File in FIG. 4 can be replaced with a new structural unit BIT. As shown in FIG. 5, the improved LSM-tree can be referred to as, for example, a disk-oriented secure LSM-tree (dsLSM-tree).

Figure 6:
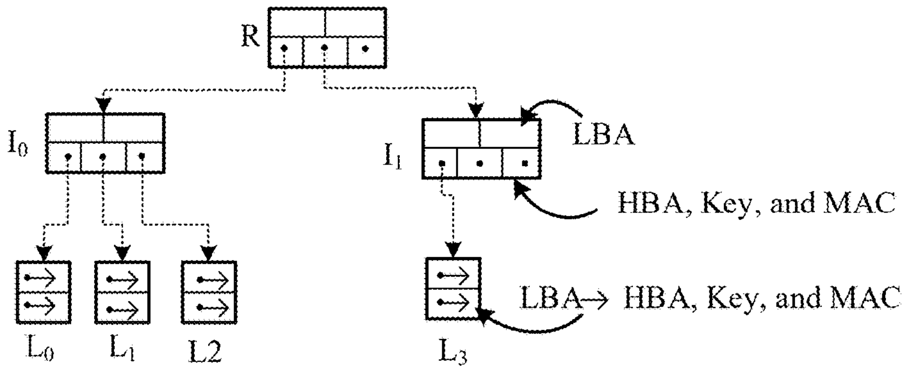
FIG. 6 is a schematic diagram illustrating a specific example of a BIT logic architecture, according to this specification.

To describe a specific structure of the BIT, FIG. 6 shows a specific example of a logical view of a BIT. As shown in FIG. 6, in one BIT, a single leaf node (for example, $L_0$, $L_1$, $L_2$, or $L_3$) can include an array (for example, LBA-HBA, key, and MAC, which can be referred to as an index entry) of one or more block index records, and the block index records in the array can be sorted based on LBA sizes. A root node (denoted as R in FIG. 6) or another internal node (denoted as $I_0$, $I_1$, etc. in FIG. 6) can also be collectively referred to as a non-leaf node. The non-leaf node locates a child node of the non-leaf node by storing an HBA of the child node of the non-leaf node, and protects security of the child node based on a stored encryption key and a stored MAC of the child node of the non-leaf node. That is, each node usually corresponds to a key and an authentication code MAC for authenticated encryption, and the information can be stored in an upper-level node of the node.

Specifically, because block index arrays in the leaf node are sorted in a sequence of LBA sizes, a single node in the non-leaf node can obtain an interval through division based on an LBA size of a ciphertext data block. For example, in FIG. 6, it is assumed that a node R obtains three intervals through division based on two LBA partitioning points (for example, 200 and 400). For example, the three intervals are an interval less than or equal to 200, an interval from 201 to 400, and an interval greater than 400. For example, an interval corresponding to a node $I_0$ is less than or equal to 200, and the node $I_0$ corresponds to three leaf nodes $L_0$, $L_1$, and $L_2$ based on two LBA partitioning points (for example, 20 and 100). In addition, an MAC of a single leaf node can be stored in all upper-level nodes of the single leaf node. Optionally, a plurality of index entries can be written to one leaf node. For example, a size of a leaf node can be consistent with a size of a data block (for example, 4 KB), and a maximum of an index entry that occupies one data block can be written.

A structural unit in a form of the architecture shown in FIG. 6 serves as an index structural unit of the improved LSM-tree (namely, dsLSM-tree). This design can satisfy a requirement of the secure block device, facilitate an inplace update, and have higher retrieval efficiency.

The following describes the technical concept of this specification in detail with reference to a process in which user data in a TEE are written to a hard disk by using a secure block device.

Figure 7:
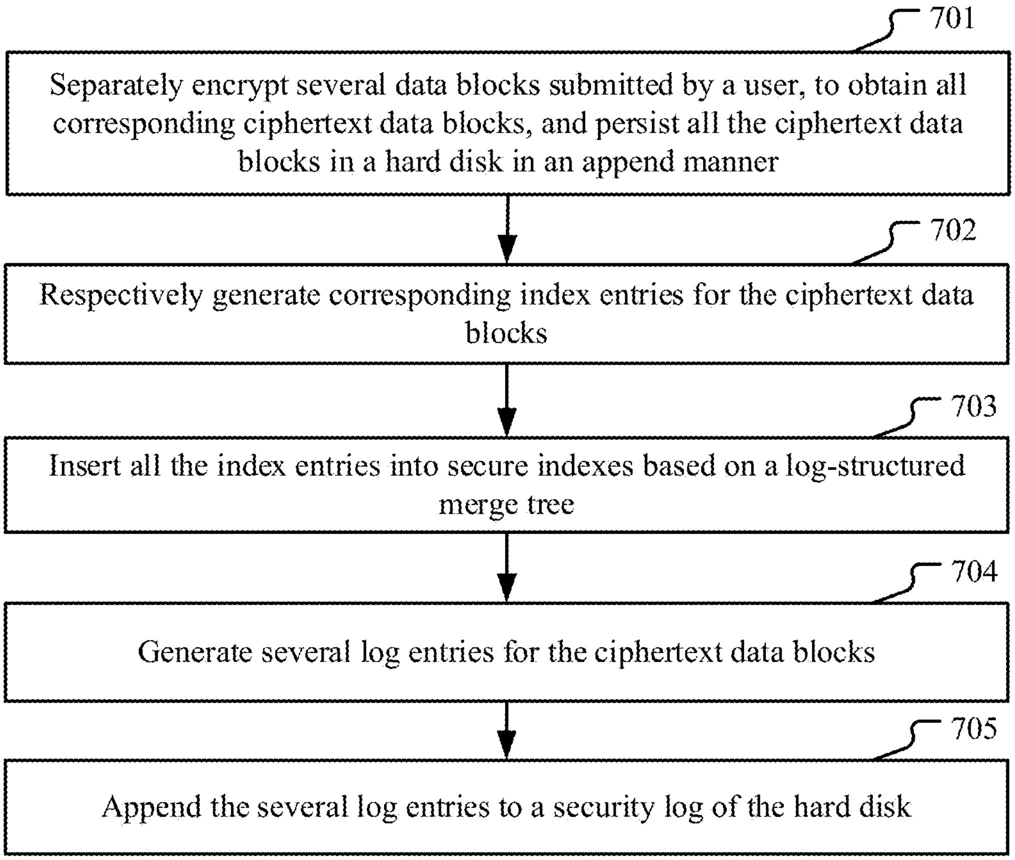
FIG. 7 is a flowchart illustrating a log-structured secure data storage method, according to an embodiment.

FIG. 7 shows a log-structured secure data storage procedure, according to an embodiment of this specification. The procedure can be used to store data in a hard disk in a trusted execution environment, and ensure data security for an attacker. That is, a block I/O operation performed by a user on an untrusted hard disk in the trusted execution environment is protected. The trusted execution environment (TEE) can be replaced with another secure zone or a trusted zone other than the TEE. This is not limited in this specification. An execution body of the procedure can be disposed in the trusted execution environment, for example, is a secure block device shown in FIG. 1. The trusted execution environment can be provided in any computer, device, or server that has a specific data processing capability.

The procedure shown in FIG. 7 can include the following steps: Step 701: Separately encrypt several data blocks submitted by the user, to obtain all corresponding ciphertext data blocks, and persist all the ciphertext data blocks in the hard disk in an append manner. Step 702: Respectively generate all corresponding index entries for all the ciphertext data blocks, where a single index entry is used to locate and protect one ciphertext data block. Step 703: Insert all the index entries into secure indexes based on a log-structured merge tree, where the secure indexes are persisted in the hard disk. Step 704: Generate several log entries for the ciphertext data blocks, where the log entries are used to locate and protect the corresponding ciphertext data blocks when a system crash occurs, and a single log entry corresponds to one or more ciphertext data blocks. Step 705: Append the several log entries to a security log of the hard disk, where the security log is persisted in the hard disk.

The procedure shown in FIG. 7 can be applied to a specific service scenario in which application data in the TEE are written to an external hard disk. In this scenario, an application (app) in the TEE can pack a to-be-written file, etc. into a form of a data block, and write the data block into the hard disk in a ciphertext form by using the secure block device.

First, in step 701, the several data blocks submitted by the user are separately encrypted, to obtain all the corresponding ciphertext data blocks, and all the ciphertext data blocks are persisted in the hard disk in an append manner.

The user here can represent the application in the TEE. The user can submit one or more data blocks at one time. For example, the user can submit the data blocks by using a write request. For example, a write request submitted by the user is write (LBA, nblocks, buf), LBA represents a logical address of a start data block in several currently submitted data blocks, nblocks represents a quantity of currently submitted data blocks, and buf can represent a memory cache.

In the TEE, the data block can exist in a plaintext form. The several data blocks submitted by the user can be encrypted before being written to the hard disk. Specifically, encryption keys are respectively generated for all plaintext data blocks, the plaintext data blocks are encrypted to obtain corresponding ciphertext data blocks, and then the ciphertext data blocks are written to the hard disk in an append (log) manner.

According to a possible design, the data block can be managed in a form of a data segment, and the segment is used as an append unit. The segment can be a group of consecutive blocks. A log-structured file system allocates space of the hard disk in a form of a segment, so that almost all log records are sequentially written to the hard disk, to improve an original I/O throughput of the hard disk to the maximum limit. In this embodiment of this specification, a default size of the data block is, for example, 4 kilobytes (4 KB), and a default size of the data segment is, for example, 4 megabytes (4 MB).

In this case, after receiving a data block write request of the user, the data block can be appended to a current data segment in the memory cache. It can be understood that the TEE can use data in the memory cache. In this case, the data is still in a trusted and protected state. The entire data segment can be written to the hard disk, to ensure that all the data blocks are sequentially recorded in an append manner, thereby ensuring that all data blocks in the data segment are sequentially written. Therefore, the current data block can be first sequentially written to the current data segment in the cache. The current data segment in the cache can be a data segment that is not fully written. For example, the current data segment is [B0, B1], and includes only two data segments B0 and B1. After the write request is received, the data block can be appended to B2, B3, B4, and B5. The current data segment is updated to [B0, B1, B2, B3, B4, B5], and continues to wait for a new data block to be written. It is assumed that the current data segment is nearly fully written. For example, the current data segment is fully written after two data segments B2 and B3 are written. In this case, the subsequent data segments B4 and B5 are written to a new current data segment. In an optional embodiment, the data block is written to the current data segment in the cache, and information indicating that writing has been successful can be fed back, to reduce a waiting time of the user (app). Because the data block in the data segment is recorded in an append manner, internal data of a current segment are stored in a sequence in which the user submits the data block.

When the data block written to the hard disk is managed by the data segment, the data segment can write the entire data segment to the hard disk when a first condition for writing the data segment into the hard disk is satisfied. When the current data segment satisfies the first condition for writing the data to the hard disk, the secure block device in the TEE can separately encrypt all the data blocks in the data segment, and sequentially write all the data blocks in the data segment to the hard disk.

In an embodiment, the first condition can be, for example, that the current data segment is fully written, for example, 1024 data segments are written, or a quantity of remaining bytes that can be accommodated is less than a size of a data block. It can be understood that, to avoid occupying too much space in the TEE, when the current data segment is fully written, the entire data segment can be written to the hard disk together in a timely manner.

In another embodiment, for example, if a data record condition is that a flushing request is received, the current data segment can be written to the hard disk when the flushing request is received. Data content in the cache may be cleared due to flushing of the TEE. Therefore, when any flushing request that may flush a cache of a secure zone and that is of a device in which the TEE is located is received, the current data segment can be written to the hard disk, to avoid a data loss.

In still another embodiment, a service data update frequency is not frequent enough. For example, if a service data amount is not large, the current data segment can be periodically written to the hard disk, to avoid a data loss or a failure of persisting the current data segment in the hard disk in a timely manner. In this case, the first condition can be, for example, predetermined duration in which the current data segment reaches the cache. In another embodiment, the data record condition can be another condition. Details are omitted here for simplicity.

The encryption key and the data block can be in a one-to-one correspondence. For example, it is assumed that a data segment includes eight data blocks [B0, B1, B2, B3, B4, B5, B6, B7]. When the data segment is written to the hard disk, keys key0, key1, key2, key3, key4, key5, key6, and key7 that are in a one-to-one correspondence with all the data blocks can be generated. Each key is used to encrypt each data block in a one-to-one correspondence. For example, the obtained ciphertext data segment can be [E0, E1, E2, E3, E4, E5, E6, E7]. The ciphertext data segment can be written to the hard disk, to protect data security. A key generation and encryption process of each data block can be performed before the data block is written to the current data segment, or can be performed when the current data segment is written to the hard disk. This is not limited in this specification.

Next, corresponding index entries are respectively generated for the ciphertext data blocks in step 702.

It can be understood that a purpose of writing the data block to the hard disk is to be used in a subsequent service processing process. Therefore, when the ciphertext data segment is written to the hard disk, index information required for querying each data block further needs to be considered. In the index field, if data are usually recorded by using a key value pair (which can be denoted as K-v in this specification), one index entry can correspond to one key value pair K-v. The index is usually constructed based on a key K, and a corresponding value (value or v) can be obtained as retrieved data based on the key.

In a process of storing data in a form of a data block, a logical address LBA of the data block can be used as a key K, and a host block address (HBA), an encryption key, and an authentication code MAC for authenticated encryption protection are used as a value. In this case, one K-v pair can be LBA-(HBA, key, MAC). The LBA is a logical address known when the data block is received, the key is an encryption key generated when data are encrypted, the HBA is a host block address (also referred to as a physical address) for actual storage in the hard disk, and the MAC is an authentication code for verifying authenticated encryption performed on the data block based on the key. The MAC can be, for example, a hash value determined for the encrypted data block in a hash method.

In this specification, one piece of index information can include K-v data of one ciphertext data block. Such a piece of index information can be referred to as an index entry. In an example, it is assumed that a data block currently written to a disk includes a first data block, and authenticated encryption is performed on the first data block based on a first key $key_1$, to obtain a first ciphertext data block and an authentication code $MAC_1$. The first ciphertext data block can be located and protected by a first index entry, and the first index entry can include a logical address $LBA_1$ of the first data block and a physical address $HBA_1$, the first key $key_1$, and the authentication code $MAC_1$ that are stored in the hard disk.

Further, in step 703, all the index entries are respectively inserted into the secure indexes based on the log-structured merge tree. The secure indexes are persisted in the hard disk.

It can be understood that, based on the above-mentioned descriptions, an index mechanism in this specification is a variant of an LSM, and an implementation solution in which a BIT is used as an LSM index unit is specially designed. In the technical concept of this specification, when a ciphertext data block is written to the hard disk, an index entry generated for the ciphertext data block can be inserted into a first memory table memtable. In the memtable, all index entries can be arranged in a sequence in which data blocks are written to the hard disk. When the memtable satisfies a second condition for index persistence, the memtable can be switched to an immutable memtable, for example, a second memory table, to persist the index entry in the memtable to the hard disk.

In an optional embodiment, the index entry can be appended to a log (a log in the hard disk shown in FIG. 5) corresponding to the log-structured merge tree when data are written to the first memory table, to avoid a system crash occurring before the index entry in the first memory table is persisted as a BIT. The index entry in the log can be cleared when being persisted in the hard disk. In this way, it can be ensured that logs in the hard disk for the dsLSM-tree can sequentially record the latest index entries. When the system crash occurs before the index entry in the first memory table is persisted as the BIT, the first memory table can be recovered based on the log in the hard disk.

In some implementations of this specification, a BIT is logically the architecture shown in FIG. 6, and can exist in an append form in the hard disk. An index entry in the hard disk can be written in a form of a BIT. When the index entry is written to the hard disk, the immutable second memory table, namely, the immutable memtable, can be traversed, so that all the index entries are recorded in leaf nodes in a corresponding range one by one based on corresponding LBA sizes, until the leaf nodes are fully written. When all leaf nodes of an intermediate node are fully written, the intermediate node can be recorded, and finally a root node is recorded. In some embodiments, for an authenticated encryption requirement, it can be set that a node size of the BIT and a size of the data block are consistent, for example, both are 4 KB.

Figure 8:
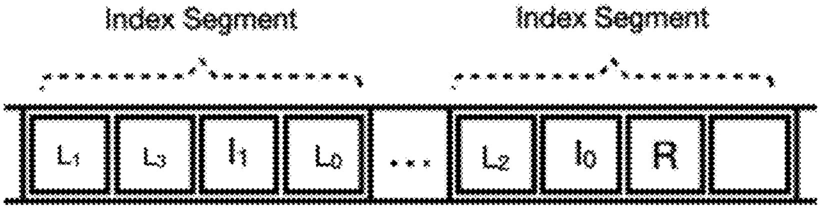
FIG. 8 is a schematic diagram illustrating storage of a BIT structure in the specific example shown in FIG. 6 in a hard disk in an append manner.

In an optional implementation, the index can also be managed in a form of a segment. As shown in FIG. 8, one BIT can correspond to a plurality of index segments. One index segment can include a preset quantity of nodes (four nodes are shown in FIG. 8, and there can be another quantity in practice). In a specific example, a size of a BIT can be the same as a size of a data segment.

It is assumed that FIG. 8 shows hard disk data for recording the logical structure of the BIT in FIG. 6. One leaf node can record two index entries. If a leaf node $L_1$ is fully written with two index entries, the node $L_1$ and an index entry of the leaf node $L_3$ are first recorded in an index segment, and then if the leaf node $L_3$ is fully written with two index entries, the node $L_3$ and an index entry of the leaf node $L_3$ are recorded in an index segment. In this case, because all leaf nodes of the intermediate node $I_1$ are fully written, the node $I_1$ and related information of the leaf node of the intermediate node $I_1$ can be further recorded in the index segment, for example, information such as a MAC and an LBA range partitioning point of the leaf node of the intermediate node $I_1$. Then, if the leaf nodes $L_0$ and $L_2$ are successively fully written with two index entries, the leaf nodes $L_0$ and $L_2$, the intermediate node $I_0$, and related index information in the root node R are sequentially recorded. The index segment helps manage the index information. As shown in FIG. 6, inside the BIT, all index entries are recorded in ascending order of LBAs. Index information of all nodes is recorded in the index segment in an append manner in a sequence in which all the nodes are fully written. After an index segment is fully written, the entire index segment can be written to the first level of the dsLSM-tree in the hard disk, and until an index segment in which the root node is located is written to the hard disk, a BIT generation process ends. When a single BIT is stored in the hard disk, authenticated encryption can also be performed on the BIT based on the key and the MAC. Details are omitted here for simplicity.

In an embodiment, the second condition can be that a flushing request is received. In another embodiment, the second condition can be that a compaction request is received. When an index entry of the LSM-tree in a memory is written to the hard disk, a BIT can be created and written to the first level of the LSM-tree, and all keys (LBA) are classified into different BITs, a same key K does not exist in the same BIT, and a same key K can exist in different BITs. An essence of a merging operation is to merge the same keys K in different BITs. Therefore, when the BIT is written into the hard disk, the BIT can be effectively constructed and persisted through merging and compression. It should be noted that merging and compression of the dsLSMtree can be performed when a specific condition is satisfied. For example, a BIT at one level fully occupies preset space of the level.

In such a write manner, when retrieval is available, a corresponding range is successively searched from the root node to the leaf node based on an LBA value, and is verified based on the MAC. For example, in the above-mentioned example, to search for a data block whose LBA is 100, a corresponding range less than or equal to 200 is first searched for in the root node R, and is verified based on the MAC in the root node. If it is determined that the root node has a corresponding lower-level node, the node $I_0$ continues to be searched. A range in $I_0$ is searched for and is verified based on the MAC, to obtain an array of block index records in the leaf node $L_1$, for example, ($HBA_1$, $Key_1$, $MAC_1$). After verification is performed based on the MAC, a corresponding data block is extracted from the host block address $HBA_1$. The corresponding data block can be decrypted based on $key_1$.

In an optional embodiment, a block index table category (BITC) can also be introduced to record the BIT, to manage the BIT. The BITC includes a plurality of BIT entries. Each BIT entry includes metadata of one BIT, and the metadata of the BIT can include, for example, an ID and a level of the BIT, and an HBA, a key, and a MAC of a root node of the BIT. In this case, the LSM-tree described above can include a dynamic quantity of BITs, and a quantity of BITs that can be maintained by the BITC changes with the BIT.

In addition, in step 704, several log entries are generated for the ciphertext data block.

Here, the log entry can be an information record written to the security log. A single log entry can correspond to one or more ciphertext data blocks. A security log (Journal) can record writing information of a data segment written to the hard disk, to recover data in a case of a system crash (which can include various states in which a system cannot run normally, for example, a breakdown or a power failure). Specifically, the log entry is used to still locate and protect a corresponding ciphertext data block in a case of the system crash. For example, the log entry can include ciphertext information (a key of the data block, a verification data MAC, etc.) of updating in a corresponding hard disk of the log entry, and a written data block address (HBA). In other words, the log entry generated for the ciphertext data block can include a data block address HBA, a key, a verification data MAC, etc. of the ciphertext data block. In a log entry generation process, one log entry can be generated for a single ciphertext data block, or a log entry can be generated for a plurality of ciphertext data blocks. This is not limited in this specification.

Next, in step 705, the several log entries are appended to the security log of the hard disk.

The log entry can also record updating data of the hard disk in the append manner. Because the log entry in the security log Journal can include encryption information of updating in the corresponding hard disk of the log entry, confidentiality, integrity, and freshness of updating are ensured.

In an optional implementation, a log entry can be stored in a form of a block (for example, a block is a 4 KB), for example, is referred to as a log block. In some embodiments, the log block can be persisted in the hard disk as a chained block sequence on which authenticated encryption protection is performed. Specifically, an authentication code MAC of a single log block is embedded into a next log block, to ensure that all blocks in the log record are associated in a storage sequence. In this way, a possibility of misleading due to a false operation history forged by an attacker can be ruled out.

In an embodiment, a single log block can have two MAC copies. The first copy is stored in the hard disk in a plaintext form together with an encrypted log block. To improve I/O efficiency, a size of the log block can be set to be less than a size of a conventional block (for example, the above-mentioned normal data block of 4 KB), so that the log block and a MAC of the log block can be placed in the same conventional block. The second copy of the MAC of the log block can be stored in a next log block of the log block, for example, stored in a chained manner as described above. This solution can verify integrity of each log block, and more importantly, verify integrity of the entire security log.

In a possible design, on the basis of the log record, the security log can also be set through a checkpointing pack, along with recovery and commitment, to implement a data consistency and atomicity. The checkpointing pack is to recover hard disk space in a log region and accelerate a recovery process, and periodically convert the log record into a more compact format, namely, checkpointing, to save more space. For example, the checkpointing pack (which emphasizes content) can include a timestamp, and head and tail locations of the security log, and can store the metadata of the BIT (for example, the block index table category (BITC)). To ensure a crash consistency, two checkpointing packs can be retained in the hard disk, and both are in a checkpointing region, so that at least one of the two checkpointing packs is valid. After the checkpointing pack is stored in the hard disk, a checkpointing pack record can be written to the security log, and the record references a new checkpointing pack.

Usually, the hard disk can be initialized in a case of an initial connection to a new hard disk or a system crash. During initialization, the nearest checkpointing pack can be selected from the two checkpointing packs, and head and tail cursors of the security log are read from the selected checkpointing pack. Further, the security log is scanned to start a recovery process, to find the last checkpointing pack, and a memory data structure in the TEE is initialized based on a record of the checkpointing pack. The remaining part of the security log is read starting from the last checkpointing pack, and one record (corresponding to one log entry) is redone at one time, to recover memory data in the TEE to a state of being consistent with the record of the security log in the hard disk.

In an optional implementation, the checkpointing pack can record a reverse index table of mapping from the HBA to the LBA. Mapping from the HBA to the LBA can be established in the reverse index table (RIT), and is contrary to a secure index (mapping from the LBA to the HBA is established) maintained by the BIT. The RIT can include an LBA of each valid block. Therefore, the RIT is queried, to retrieve an LBA of a cleared data block. The RIT is queried, to clear an invalid data block. When data are managed in a form of a segment, the RIT can include an LBA of a valid block in each data segment, a to-be-cleared segment is given, and an invalid block in the data segment can be cleared.

Further, in an embodiment, the reverse index table (RIT) is hard disk data (which can have no MAC) subject to encryption protection (encrypted based on a key generated for the hard disk data). The RIT needs to be encrypted, because the RIT includes sensitive information of the LBA. If the sensitive information is leaked, it is not conducive to privacy preserving. A reverse index provided by the RIT can be easily verified based on the secure index. Therefore, it is secure to store the RIT without integrity protection.

Each block or node can be protected based on a unique encryption key. In an optional embodiment, the key can be generated by a random key generator, for example, a value of random 16 bytes. Keys of a data block, a BIT block, and BIT nodes (including a leaf node and a non-leaf node) can be randomly generated, and a key of a node can be stored by a “parent” node of the node for subsequent retrieval. In another embodiment, the key can be a deterministic key. For example, a key of the log block or the RIT block can be determined based on a deterministic key derivation function. An input of the key derivation function can be, for example, a key derivation key (KDK) or a sequence number. For example, the KDK of the log block can be a trusted root key (which can be obtained in advance securely and reliably) securely owned by the TEE, and the sequence number is logical IDs continuously increased in the log block. Key management can be simplified in a deterministic key derivation manner, because only the KDK needs to be stored.

When an I/O mode is a log record, all data structures including LBAs are encrypted in the hard disk, so that the LBA is leaked out of the secure zone (TEE). In this way, anonymity of writing data to the hard disk in the secure zone can be satisfied.

In an optional implementation, when data are managed in a form of a segment, the checkpointing pack can further record metadata of a segment such as a segment validity table (SVT) or a data segment table (DST). The metadata of the segment can be a data structure used to allocate, release, or clear the segment, etc. Allocation and release of the segment are usually for use of the entire data segment (for example, space corresponding to a 4 MB), and clearing of the segment is a process of processing some data of the segment. For example, a valid block of a dirty segment is migrated to a new location, and an invalid block is discarded to recover space of the dirty segment. The dirty segment can represent a segment in which some data blocks are valid and some data blocks are invalid. The reverse index table (RIT) can also be used as the metadata of the segment.

The SVT is a bitmap, each bit corresponds to one segment, and a value of the bit indicates whether one segment is valid. For example, 1 indicates that a segment is valid, and 0 indicates that a segment is invalid. Usually, a segment including some valid data blocks (whose content is useful or updated to a specific date) is valid. A valid data block is briefly referred to as a valid block, and an invalid data block is referred to as an invalid block. If a segment includes both a valid block and an invalid block, it can be considered that the segment is partially valid. In an optional embodiment, two SVTs can be set, one SVT is used to manage a data segment, and one SVT is used to manage an index segment (BIT).

The data segment and the index segment can be allocated based on respective SVTs. The entire valid or invalid segment can be released by simply updating a corresponding value in the SVT. For example, an index segment is usually used as a whole, and therefore can be released by updating the SVT of the index segment. However, the data segment may be partially valid. Therefore, an additional data structure (for example, a DST and an RIT) may need to be used for clearing.

It can be understood that segment clearing performance exerts important impact on performance of a log-structured storage system. In one embodiment, segment clearing can be performed in a manner in which foreground clearing and background clearing are combined, to minimize overheads. Two clearing policies are respectively used for foreground (current thread) clearing and background (another thread) clearing: a greedy policy and a cost-effective policy. The greedy policy used for foreground clearing is used to minimize a clearing delay in a local optimal manner, and the cost-effective policy used for background clearing is used to emphasize global efficiency. In another embodiment, when hard disk utilization is relatively high, a normal log can be switched to a thread log, to reduce a user-visible delay. A thread log record writes new data to a "hole" (for example, replaces an invalid block) in the partially valid data segment, without a need to clear the data segment in advance. In still another embodiment, a plurality of log record heads can be supported. In other words, a plurality of write operations are performed simultaneously. In this way, not only I/O parallelism can be improved, but also hot data and cold data can be separated into different data segments. For example, the hot data are written to the memory, and the cold data are written to the hard disk. The hot data and the cold data are determined based on data popularity (for example, an I/O repetition rate). The data popularity can be determined based on a popularity parameter included in the write request, and the popularity parameter is determined based on the user data, to perform popularity estimation. For example, a file system can estimate popularity of a block from file system-level metadata. In an optional embodiment, the above-mentioned optimization policies can be further combined with each other, so that costs of segment clearing can be effectively reduced.

The DST can include metadata of each data block in a single data segment, for example, a block validity bitmap or a modification timestamp. The block validity bitmap can be used to describe validity of each data block in the data segment. The modification timestamp can be time information of modifying the data segment. Information provided by the DST is used, to select a to-be-cleared dirty segment through greedy probing or cost-benefit analysis. For example, if it is determined, based on the timestamp, that an interval between a recording time and a current time is greater than a predetermined time period, it is considered that a corresponding data block is dirty data.

The following describes a process of reading (reading or retrieving) data from the hard disk. In summary, the secure index can be retrieved, to satisfy a data read request of a specified quantity of blocks starting from a user-specified LBA. In a retrieval process, structural units (for example, BITs) in the secure index can be retrieved one by one, until a corresponding LBA is found. When the BIT is retrieved, MAC information in the root node can be obtained from the root node starting from the root node and based on a corresponding LBA partitioning range recorded in the root node. When it is determined, through verification performed based on the MAC, that the to-be-retrieved LBA is included in the BIT, a lower-level node of the root node is further retrieved, and so on, until a corresponding leaf node is retrieved, to extract information such as the HBA and the encryption key corresponding to the LBA. Otherwise, if it is determined, in a specific node through verification performed based on the MAC, that a corresponding to-be-retrieved LBA is not included in the corresponding LBA range of the corresponding node, a next BIT is retrieved. Then, the encrypted ciphertext data block is read from data in the hard disk based on the HBA and decrypted. After integrity is verified based on the MAC, a corresponding plaintext data block can be obtained. Further, the plaintext data block can be securely fed back to the user.

In an example, it is assumed that the to-be-retrieved LBA is 200, and in child node data recorded in a root node of the first BIT, a left node corresponds to an LBA range less than 100, and the right node corresponds to an LBA range greater than 100. In this case, a key and MAC information corresponding to a right node can be obtained. It is determined, through verification performed based on the MAC, that a child node corresponding to the right node does not include the to-be-retrieved LBA=200. In this case, the second BIT can continue to be retrieved. It is assumed that in child node data recorded in a root node of the second BIT, a left node corresponds to an LBA range less than 300, and the right node corresponds to an LBA range greater than 300. Through verification performed based on the MAC, the to-be-retrieved LBA can be matched to the left node in the child node of the root node, and further matched to a leaf node C through verification performed based on the MAC of the child node in the left node. In this case, information such as an HBA corresponding to LBA=200 can be read from the leaf node C, so that a ciphertext data block corresponding to the corresponding LBA=200 is read from a corresponding location in the hard disk based on the HBA information, and the ciphertext data block is decrypted based on the corresponding encryption key, to obtain the corresponding plaintext data block.

It should be noted that, in the above-mentioned process, a process of generating the index entry in step 702 and step 703, and a process of generating the log entry in step 704 and step 705 are different operations performed on the ciphertext data block, and can be performed in parallel or in an exchanged sequence. This is not limited in this specification. An execution body of the above-mentioned process can be disposed in the TEE (for example, the secure block device described in FIG. 1). Therefore, in a description process in FIG. 7, a part (other than the app or user in the TEE) executed by the TEE can be executed by the execution body disposed in the TEE.

The technical solution in the embodiment in FIG. 7 is executed in the append manner (when new data are written, the new data are recorded in the append manner, and old data do not need to be replaced), and the secure index and the security log that are based on the log-structured merge tree (a new version is found before an old version, and a historical index entry does not need to be modified) are used. When a single ciphertext data block is written to the hard disk, additional data are only a single index entry and a maximum of one log entry (one log entry can correspond to one or more ciphertext data blocks). It can be understood that a data amount of the index entry and the log entry is far less than a data amount of the ciphertext data block. Therefore, in a storage process of the ciphertext data block, approximate I/O costs of securely writing the data block to the hard disk are (1+ε) times of a data amount included in a single data block: D (ciphertext data block+index entry+log entry)/D (ciphertext data block)=1+ε. D denotes a data amount, and & is a quantity that is far less than 1. The I/O costs are far less than 2×H (H≥2, as shown in FIG. 2) in the conventional technology. That is, according to the method for writing data to a hard disk in a secure zone provided in this specification, a written data amount can be greatly reduced. In other words, write amplification is reduced.

In conclusion, this specification provides the log-structured secure data storage procedure. The secure block device in the TEE writes the data to a hard disk in a non-secure environment. The data storage procedure is performed based on the append manner. With reference to the secure index and a data record mechanism of the security log in a memory cache and the hard disk, protection of data confidentiality, integrity, freshness, and a consistency are fully considered, both anonymity and atomicity of data can be considered, and data write amplification is effectively reduced, to improve efficiency of writing data to the hard disk in the secure zone.

Figure 9:
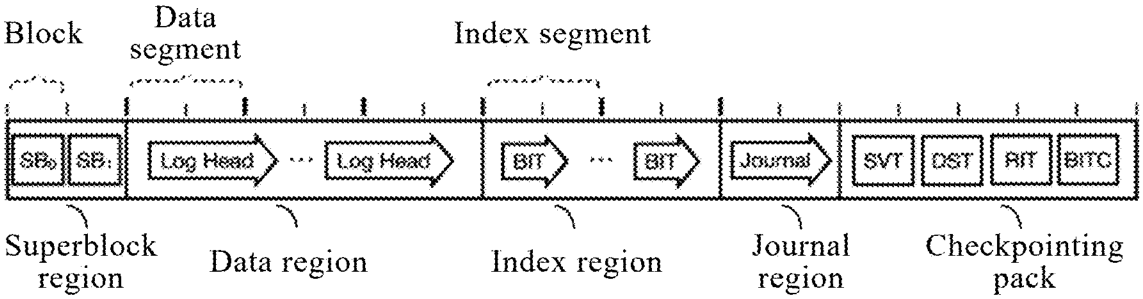
FIG. 9 is a schematic diagram illustrating a specific example of a hard disk partitioning architecture for implementing a technical concept of this specification.

To further clarify a specific application of the technical solution provided in this specification, FIG. 9 is a schematic diagram of a specific example in which the technical solution in FIG. 7 is implemented by dividing a hard disk into a plurality of storage intervals.

As shown in FIG. 9, the hard disk can be initialized and divided into five storage regions. For example, the five storage regions are as follows: A first region can be, for example, referred to as a superblock region here, and is configured to store a basic parameter of the hard disk, for example, a size of a block of various data, a size of a segment, and location information of another region in the hard disk. Information recorded in the region is usually relatively fixed. A second region can be, for example, referred to as a data region here, and is configured to record a ciphertext data block of a user in an append manner. A third region can be, for example, referred to as an index region here, and is configured to record index information of an encrypted data block in the data region in an append manner. A fourth region can be, for example, referred to as a journal region here, serves as a large buffer, usually has large storage space, and is configured to store a security log. A fifth region is, for example, referred to as a checkpoint region here, and is configured to store information that can describe various data states in the hard disk, for example, head and tail locations of the security log, an SVT, a DST, and an RIT.

Before data are written to the hard disk, a TEE (for example, the secure block device in the TEE, which is similar below) can first initialize the hard disk, to format the hard disk into the above-mentioned five regions. Optionally, the index region (third region) can be initialized based on a structure of an LSM tree.

When the TEE receives a write request of the data, the TEE can first append a received data block into a buffered current data segment, and feed back a write success request to the user. Until a data segment record condition is satisfied, the current data segment is written to the second region in FIG. 9. In addition, an index entry can be generated for each ciphertext data block in the ciphertext data segment, and a single index entry can include, for example, LBA-(HBA, Key, MAC) corresponding to a single ciphertext data block. The index entry can be appended to the current index table (for example, memtable cache index table). In addition, in the security log in the fourth region, each piece of data block information written to the hard disk is recorded. If necessary, information related to a data segment in the SVT and the DST in the fifth region can be modified. Optionally, in a process of writing the ciphertext data block into the hard disk, validity information in the SVT and the DST can be further queried, so that the corresponding ciphertext data block can be written to a hole in an invalid segment or a partially valid segment.

When a current index block satisfies an index record condition, an index entry recorded in the current index table can be written to the third region of the hard disk. The current index table memtable can be first converted into an immutable index table (a second memory table), for example, immutable memtable, to be merged into an LSM tree in the third region of the hard disk. When data items LSM trees in the immutable index table are merged, index entries in the immutable index table are first sequentially traversed, to construct each BIT unit, and then the BIT unit is written to the first level of the LSM tree. In this case, information (for example, index information corresponding to a data block and BIT structure information) of writing the BIT unit to the hard disk can be recorded in a log record in the fourth area. In addition, a block index table category (BITC) can be recorded, related content in the related SVT and the related DST can be modified and retrieved, and information such as the RIT can be recorded in the fifth area.

When data are recorded in the security log in the fourth area, a log block can be used as a data unit for recording. A single log block can include information about one or more data blocks and an index entry waiting record, and corresponds to a log block authentication code MAC. In this way, log blocks can be embedded into each other based on MACs of adjacent blocks, to maintain a chained structure, and avoid a disordered sequence, replacement of data by an attacker, or data recovery of a crash.

In some embodiments, if a crash occurs before the data block is submitted to the hard disk, data that are not submitted can be discarded, to maintain a consistency between data records. If a crash occurs before the index table is submitted to the hard disk, the secure zone can recover the current index table (for example, the memtable table) based on the log record in the fourth area.

In a specific example shown in FIG. 9, confidentiality, integrity, and freshness of user data can be ensured by constructing the LSM tree in the third area. The security log in the fourth area can implement consistency and atomicity of the secure zone and hard disk data. An encryption mechanism of the RIT in the fifth area can ensure anonymity of the user data. In addition, on the basis of ensuring the above-mentioned security performance, the technical solution provided in this specification can further greatly reduce write amplification.

Figure 10:
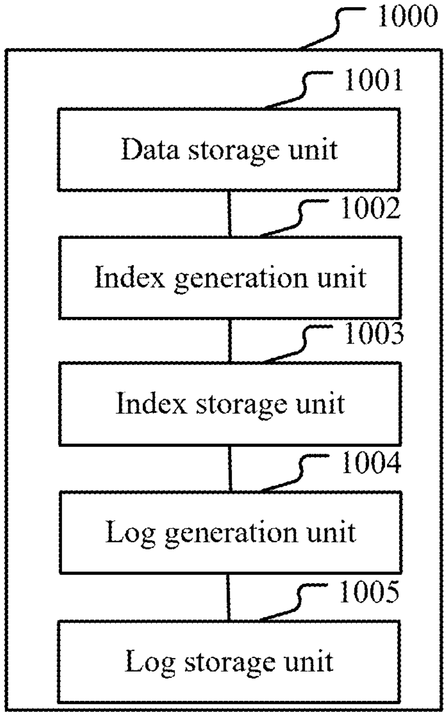
FIG. 10 is a schematic block diagram illustrating a log-structured secure data storage apparatus, according to an embodiment.

According to another embodiment, a log-structured secure data storage apparatus disposed on a computing party is further provided. The apparatus can be used for protecting a block I/O operation performed by a user on an untrusted hard disk in a trusted execution environment. FIG. 10 shows a log-structured secure data storage apparatus 1000 according to an embodiment. The apparatus can be disposed in a TEE, for example, is a secure block device in FIG. 1.

As shown in FIG. 10, the apparatus 1000 includes:

a data storage unit 1001, configured to: separately encrypt several data blocks submitted by the user, to obtain all corresponding ciphertext data blocks, and persist all the ciphertext data blocks in the hard disk in an append manner;

an index generation unit 1002, configured to respectively generate all corresponding index entries for all the ciphertext data blocks, where a single index entry is used to locate and protect one ciphertext data block;

an index storage unit 1003, configured to respectively insert all the index entries into secure indexes based on a log-structured merge tree, where the secure indexes are persisted in the hard disk;

a log generation unit 1004, configured to generate several log entries for the ciphertext data blocks, where the log entries are used to locate and protect the corresponding ciphertext data blocks when a system crash occurs, and a single log entry corresponds to one or more ciphertext data blocks; and a log storage unit 1005, configured to append the several log entries to a security log of the hard disk, where the security log is persisted in the hard disk.

It should be noted that the apparatus 1000 shown in FIG. 10 corresponds to the method described in FIG. 7, and corresponding descriptions in the method embodiment in FIG. 7 are also applicable to the apparatus 1000. Details are omitted here for simplicity.

An embodiment of another aspect further provides a computer-readable storage medium. The computer-readable storage medium stores a computer program, and when the computer program is executed on a computer, the computer is enabled to perform the method described with reference to FIG. 7, etc.

An embodiment of still another aspect further provides a computing device, including a memory and a processor. The memory stores executable code, and when the processor executes the executable code, the method described with reference to FIG. 7, etc. is implemented.

A person skilled in the art should be aware that in the one or more examples, functions described in embodiments of this specification can be implemented by hardware, software, firmware, or any combination thereof. When the functions are implemented by using software, the functions may be stored in a computer-readable medium or transmitted as one or more instructions or code in the computer-readable medium.

The objectives, technical solutions, and beneficial effect of the technical concepts of this specification are further described in detail in the above-mentioned specific implementations. It should be understood that the above-mentioned descriptions are merely specific implementations of the technical concepts of this specification, but are not intended to limit the protection scope of the technical concepts of this specification. Any modification, equivalent replacement, or improvement made based on the technical solutions of the technical concepts of this specification shall fall within the protection scope of the technical concepts of this specification.

The invention claimed is:

1. A log-structured secure data storage method for protecting a block I/O operation performed by a user on an untrusted hard disk in a trusted execution environment, wherein the method comprises:

separately encrypting several data blocks submitted by the user, to obtain all corresponding ciphertext data blocks, and persisting all the ciphertext data blocks in the hard disk in an append manner;

respectively generating all corresponding index entries for all the ciphertext data blocks, wherein a single index entry is used to locate and protect one ciphertext data block;

respectively inserting all the index entries into secure indexes based on a log-structured merge tree, wherein the secure indexes are persisted in the hard disk, wherein the log-structured merge tree corresponds to a first memory table, a second memory table, and a plurality of levels in the hard disk, the second memory table is used to be persisted at the plurality of levels, a block index table at each level is capable of being successively merged into subsequent levels until the last level, wherein respectively inserting all the index entries into secure indexes based on a log-structured merge tree comprises:

inserting all the index entries into the first memory table; and when a second condition for index persistence is satisfied, converting the first memory table into the second memory table, to write an index entry in the second memory table to a first level in the plurality of levels;

generating several log entries for the ciphertext data blocks, wherein the log entries are used to locate and protect the corresponding ciphertext data blocks when a system crash occurs, and a single log entry corresponds to one or more ciphertext data blocks; and appending the several log entries to a security log of the hard disk, wherein the security log is persisted in the hard disk.

2. The method according to claim 1, wherein the several data blocks comprise a first data block, authenticated encryption is performed on the first data block based on a first key $key_1$, to obtain a first ciphertext data block and an authentication code $MAC_1$, the first ciphertext data block is located and protected by a first index entry, and the first index entry comprises a logical address $LBA_1$ of the first data block and a physical address $HBA_1$, the first key $key_1$, and the authentication code $MAC_1$ that are stored in the hard disk.

3. The method according to claim 1, wherein the several data blocks are a plurality of data blocks of a current data segment that are recorded in a memory in the append manner in a sequence in which the user makes submissions, and the several data blocks submitted by the user are separately encrypted, to obtain all the corresponding ciphertext data blocks.

4. The method according to claim 3, wherein all the ciphertext data blocks are persisted in the hard disk in the append manner when a first condition for writing a data segment to the hard disk is satisfied, and the first condition comprises at least one of the following: the current data segment is fully written, a flushing request is received, or record duration reaches predetermined duration.

5. The method according to claim 1, wherein the index entry is recorded in a form of the block index table (BIT) at a single level in the plurality of levels, a leaf node of a single BIT corresponds to one or more index entries, and a single non-leaf node stores an LBA range of a data block corresponding to each index entry in a child node of the single non-leaf node and each authentication code MAC for performing authenticated encryption protection on each child node.

6. The method according to claim 1, wherein writing an index entry in the second memory table to a first level in the plurality of levels comprises:

traversing LBAs in the second memory table, to generate all BITs, wherein a single BIT corresponds to a plurality of consecutive index entries in the second memory table, and the plurality of index entries in the BIT are arranged in ascending order; and appending all the BITs to the first level in a completion sequence of all the BITs.

7. The method according to claim 6, wherein the single BIT is generated in the following manner:

obtaining, based on a single LBA range corresponding to a single leaf node, an index entry that satisfies the single LBA range, and recording the index entry in the single leaf node; and after a leaf node corresponding to a single non-leaf node completes a record, recording, in the non-leaf node based on an LBA range of the corresponding leaf node and an index entry in the corresponding LBA range, an authentication code MAC for performing authenticated encryption protection.

8. The method according to claim 1, wherein each log entry in the security log is stored in a form of a log block, authenticated encryption protection is performed on each log block based on a corresponding authentication code MAC, and a MAC of a single log block is embedded into a next log block.

9. The method according to claim 1, wherein the hard disk further records a reverse index table of mapping from an HBA to an LBA, and when all the index entries index entries are inserted into the secure index based on the log-structured merge tree, the method further comprises:

updating the reverse index table based on all the index entries.

10. The method according to claim 3, wherein the hard disk further records a first segment validity table (SVT) that describes, by using a bitmap, whether each data segment is valid and a data segment table (DST) that describes whether each data block in the data segment is valid, and the method further comprises:

updating the first segment validity table and the data segment table (DST) when all the ciphertext data blocks are persisted in the hard disk in the append manner.

11. The method according to claim 5, wherein the hard disk further stores a second segment validity table (SVT) that describes, by using a bitmap, whether each block index table (BIT) is valid, and the method further comprises:

updating the second segment validity table when the block index table at each level is capable of being successively merged into the subsequent levels or the index entry in the second memory table is written to the first level in the plurality of levels.

12. A non-transitory computer-readable storage medium, wherein the non-transitory computer-readable storage medium stores a computer program, which when executed by a processor causes the processor to:

separately encrypt several data blocks submitted by the user, to obtain all corresponding ciphertext data blocks, and persist all the ciphertext data blocks in the hard disk in an append manner;

respectively generate all corresponding index entries for all the ciphertext data blocks, wherein a single index entry is used to locate and protect one ciphertext data block;

respectively insert all the index entries into secure indexes based on a log-structured merge tree, wherein the secure indexes are persisted in the hard disk, wherein the log-structured merge tree corresponds to a first memory table, a second memory table, and a plurality of levels in the hard disk, the second memory table is used to be persisted at the plurality of levels, a block index table at each level is capable of being successively merged into subsequent levels until the last level, and the processor being caused to respectively insert all the index entries into secure indexes based on a log-structured merge tree comprises being caused to:

insert all the index entries into the first memory table; and when a second condition for index persistence is satisfied, convert the first memory table into the second memory table, to write an index entry in the second memory table to a first level in the plurality of levels;

generate several log entries for the ciphertext data blocks, wherein the log entries are used to locate and protect the corresponding ciphertext data blocks when a system crash occurs, and a single log entry corresponds to one or more ciphertext data blocks; and append the several log entries to a security log of the hard disk, wherein the security log is persisted in the hard disk.

13. A computing device, comprising a memory and a processor, wherein the memory stores executable code, and when the processor executes the executable code, the computing device is caused to:

separately encrypt several data blocks submitted by the user, to obtain all corresponding ciphertext data blocks, and persist all the ciphertext data blocks in the hard disk in an append manner;

respectively generate all corresponding index entries for all the ciphertext data blocks, wherein a single index entry is used to locate and protect one ciphertext data block;

respectively insert all the index entries into secure indexes based on a log-structured merge tree, wherein the secure indexes are persisted in the hard disk, wherein the log-structured merge tree corresponds to a first memory table, a second memory table, and a plurality of levels in the hard disk, the second memory table is used to be persisted at the plurality of levels, a block index table at each level is capable of being successively merged into subsequent levels until the last level, and the computing device being caused to respectively insert all the index entries into secure indexes based on a log-structured merge tree comprises being caused to:

insert all the index entries into the first memory table; and when a second condition for index persistence is satisfied, convert the first memory table into the second memory table, to write an index entry in the second memory table to a first level in the plurality of levels;

generate several log entries for the ciphertext data blocks, wherein the log entries are used to locate and protect the corresponding ciphertext data blocks when a system crash occurs, and a single log entry corresponds to one or more ciphertext data blocks; and append the several log entries to a security log of the hard disk, wherein the security log is persisted in the hard disk.

14. The computing device according to claim 13, wherein the several data blocks comprise a first data block, authenticated encryption is performed on the first data block based on a first key $key_1$, to obtain a first ciphertext data block and an authentication code $MAC_1$, the first ciphertext data block is located and protected by a first index entry, and the first index entry comprises a logical address $LBA_1$ of the first data block and a physical address $HBA_1$, the first key $key_1$, and the authentication code $MAC_1$ that are stored in the hard disk.

15. The computing device according to claim 13, wherein the several data blocks are a plurality of data blocks of a current data segment that are recorded in a memory in the append manner in a sequence in which the user makes submissions, and the several data blocks submitted by the user are separately encrypted, to obtain all the corresponding ciphertext data blocks.

16. The computing device according to claim 15, wherein all the ciphertext data blocks are persisted in the hard disk in the append manner when a first condition for writing a data segment to the hard disk is satisfied, and the first condition comprises at least one of the following: the current data segment is fully written, a flushing request is received, or record duration reaches predetermined duration.

17. The computing device according to claim 13, wherein the index entry is recorded in a form of the block index table (BIT) at a single level in the plurality of levels, a leaf node of a single BIT corresponds to one or more index entries, and a single non-leaf node stores an LBA range of a data block corresponding to each index entry in a child node of the single non-leaf node and each authentication code MAC for performing authenticated encryption protection on each child node.

18. The computing device according to claim 8, wherein the computing device being caused to write an index entry in the second memory table to a first level in the plurality of levels comprises being caused to:

traverse LBAs in the second memory table, to generate all BITs, wherein a single BIT corresponds to a plurality of consecutive index entries in the second memory table, and the plurality of index entries in the BIT are arranged in ascending order; and append all the BITs to the first level in a completion sequence of all the BITs.

* * * * *